March 11, 1952

H. W. RINGMAN 2,588,937

POPPET VALVE

Filed July 25, 1950

Inventor
HENRY W. RINGMAN

By Cook & Robinson
Attorney

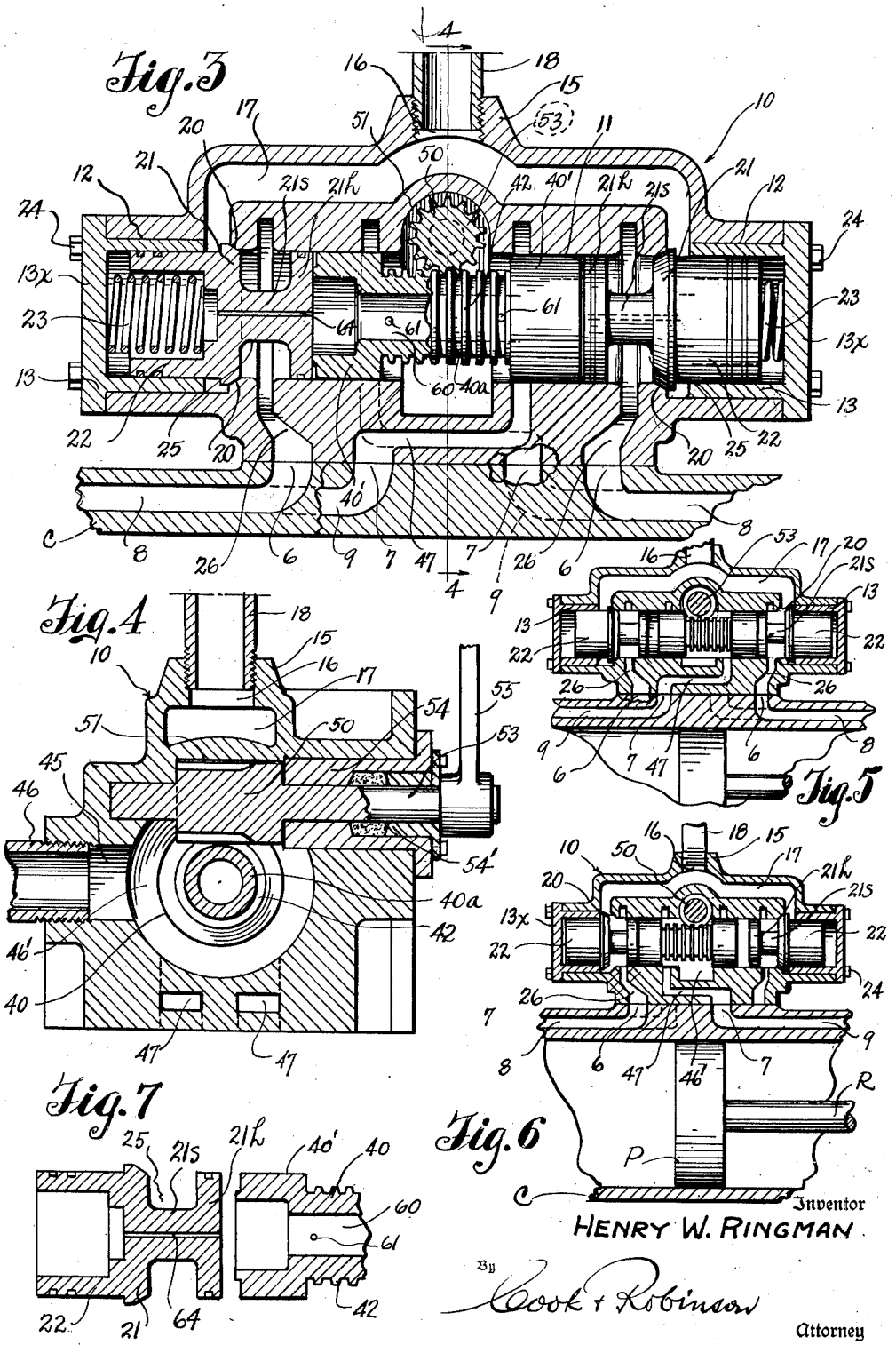

Patented Mar. 11, 1952

2,588,937

UNITED STATES PATENT OFFICE 2,588,937

POPPET VALVE

Henry W. Ringman, Everett, Wash.

Application July 25, 1950, Serial No. 175,711

2 Claims. (Cl. 121—46.5)

This invention relates to improvements in poppet valves and it has reference more particularly to an improved valve structure, designed to be used in conjunction with a double acting power cylinder, such for example, a steam cylinder as used for the operation of a log turner in a saw mill or a like cylinder as used for any other operation and powered by steam, air or other fluid pressure medium.

It is the principal object of this invention to provide a poppet valve structure and operating mechanism therefor of mechanically simplified construction; that can be easily machined; that is easily assembled or disassembled; that will require little servicing and will be effective, efficient and long lasting in its use.

Further objects and advantages of the invention reside in the details of construction and in the combination of its parts, and in the mode of use of the device, as will hereinafter be fully described.

In accomplishing the above mentioned, and other objects of the invention, I have provided the improved details of construction, the preferred forms of which are illustrated in the accompanying drawings, wherein—

Fig. 3 is a longitudinal section of the present valve structure showing a portion of the power cylinder to which it is applied.

Fig. 4 is a cross section taken on line 4—4 in Fig. 3.

Figs. 5 and 6, respectively, are views diagrammatically showing the reverse positions of the valve plug and the corresponding positions of the poppet valves.

Fig. 7 is an enlarged sectional view of parts of one of the poppet valves and actuating slide.

Referring more in detail to the drawings—

Figure 1:
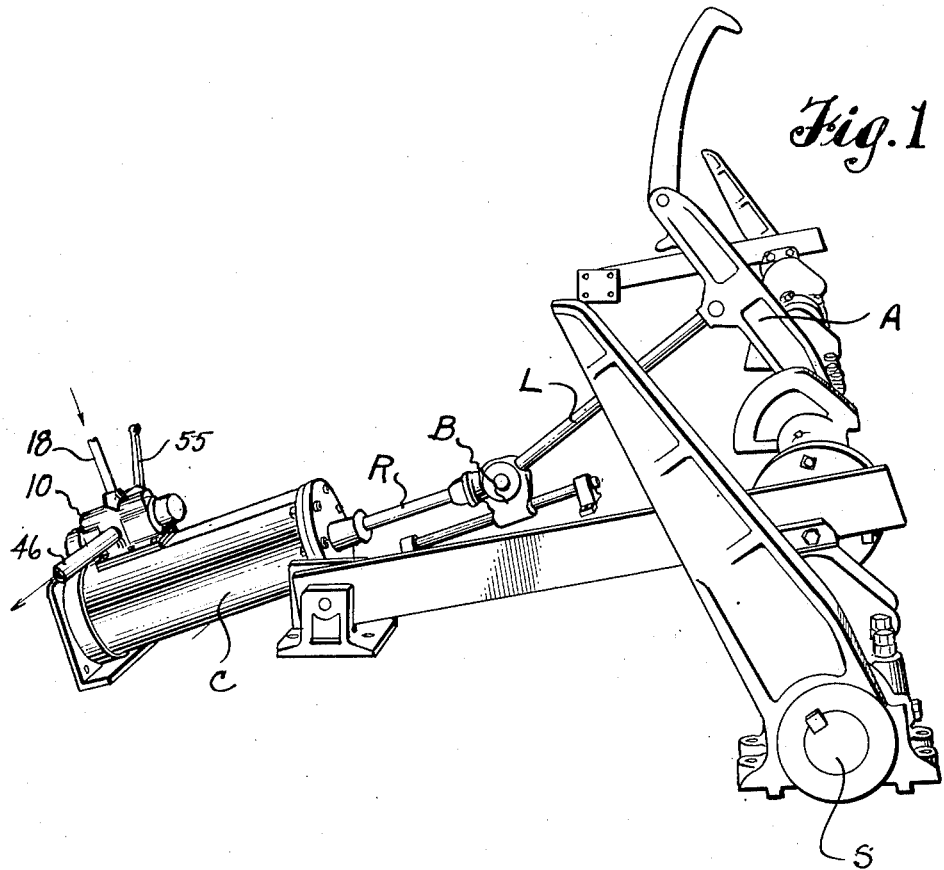
Fig. 1 is a view illustrating the application of a poppet valve structure embodied by the present invention, to a steam cylinder as used for the operation of a log turner.
Figure 2:
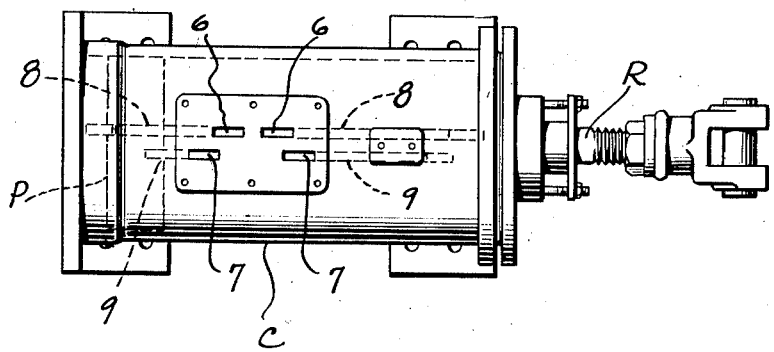
Fig. 2 is a top view of the steam cylinder with the control valve removed therefrom to better show the location of the steam intake and exhaust ports, and the passages in the cylinder block.

In Figs. 1 and 3, I have shown the present valve mechanism as associated with a power cylinder, designated by reference character C. This cylinder is equipped with a piston P, from which a piston rod R extends; the rod being operatively connected through the mediacy of a slide block B and link L with an arm A fixed on a rotatably mounted shaft S. The power cylinder C is of the double acting type and the cylinder block is shown in Fig. 2 to be formed with steam inlet ports 6—6 and with exhaust ports 7—7 which communicate respectively with passages 8—8 and 9—9 that lead to the opposite ends of the cylinder. The admittance of steam to the cylinder C and its exhaustion therefrom is under control of the poppet valve mechanism of this invention which will now be described.

Referring more particularly to Figs. 3 and 4: The valve housing is designated in its entirety by reference numeral 10. Preferably, for its present intended use, this housing is of heavy cast iron construction and is formed from end to end with a conventional straight bore 11 which is diametrically enlarged along its opposite end portions, as at 12—12, each to contain a removable valve cage 13 for a purpose presently explained.

On the top of the valve housing 10, centrally between its ends as shown in Fig. 3, is a boss 15 formed with a vertical bore 16 which opens into a steam duct or passage 17. This leads within the top portion of the housing toward its opposite ends, and is directed downwardly at its ends into the inner ends of the diametrically enlarged portions 12—12 of the longitudinal bore 11, for supplying the used pressure medium thereto. A pressure medium supply pipe 18 is threaded into the bore 16.

It is the intent of this invention that steam, compressed air or other fluid pressure medium be employed. Therefore, in the following description which recites the use of steam, it is to be understood that this shall anticipate the like use of air or any other fluid pressure medium that may be used in a like manner.

Formed at the inner ends of the diametrically enlarged portions 12—12, at the opposite ends of the longitudinal bore 11, are outwardly facing and conically tapered valve seats 20—20, against which poppet valves 21—21, respectively, are adapted to close. Each valve is conically tapered to fit the seat and at its outer end comprises a cylindrical skirt portion 22 that is slidably fitted in the corresponding cage 13. The cages are of cylindrical form and fit within the enlarged end portions of the bore. Each is formed with an outer end wall 13x adapted to seat over the end of the bore and to be secured by bolts 24 passed therethrough and threaded into the housing.

The valve cages 13 terminate short of the seats 20—20 and the end surfaces thereof serve as stops for limiting the opening movement of the poppet valves. Each valve is urged toward a position closed against its seat by means of a coiled spring 23 contained within its skirt portion and bearing at its ends against the valve and against the outer end wall of the corresponding cage 13. When the valves are both closed, the pressure medium as supplied from the pipe 18 to passage 17 is cut off from the cylinder C.

Extending inwardly from each poppet valve 21, is a central stem 21s formed at its end with a head 21h in the form of a piston that is fitted reciprocally in the bore 11. An annular passage 25 is thus formed between each valve 21 and the corresponding head 21h. The passages 25, as provided by the two valves, are maintained in communication, respectively, with passages 26—26 in the bottom wall of the valve housing and which, in the assembly of the valve housing 10 and cylinder C, register respectively with the ports 6—6 that are formed in the cylinder block and from which the passages 8—8 lead to opposite ends of the power cylinder. Thus, when a poppet valve 21 is unseated, steam can flow from the passage 17 past the open valve, through the corresponding valve passage 25 and the corresponding passage 26 and port 6 registered therewith, to admit steam to the cylinder to actuate the piston therein.

Fitted reciprocally in the medial portion of bore 11, is a cylindrical slide 40, formed with piston-like opposite end portions, 40'—40', joined by a medial portion 40a which is formed with circumferential rack teeth 42.

The housing 10 is equipped at one side, medially of its ends, with an exhaust port 45 into which an exhaust pipe 46 is threaded as shown in Fig. 4. At its inner end, the port 45 opens into an annular passage 46' that surrounds and opens into the bore 11. Formed in the base of the valve housing, are exhaust passages 47—47 that register at their outer ends with the exhaust ports 7—7 of the lower cylinder, and at their inner ends open into the longitudinal bore 11 at such location as to be covered and uncovered by the piston-like opposite end portion 40'—40' of the slide 40.

It will be understood, however, by reference to Fig. 3 that when the slide 40 is in a central, or what is termed its "neutral" position, its opposite end portions will extend across and close the inner ends of both the passages 47—47. Slide 40 is of such length that when both poppet valves are closed against their respective seats, its opposite ends will substantially abut the inner faces of the poppet valve heads 21h. Thus, the shifting of slide 40 in one direction or in the other, will effect the unseating or opening of the poppet valve toward which it moves. Such shifting of the slide to unseat a poppet valve effects the uncovering of the inner end of the corresponding exhaust passage 47 so that exhaust from the cylinder can pass to the bore 11 and thence to the exhaust port 45 of the valve housing.

The shifting of the slide 40 in one direction or the other to selectively open the poppet valves, is effected through the mediacy of a pinion gear 50 that is located in a recess 51 opening into the top of the bore 11. This gear is in operative mesh with the encircling rack teeth 42 of the slide 40. It is formed on a supporting shaft 53 that extends from the housing 10 through a bearing 54 and a packed gland 54'. At its outer end the shaft 53 is equipped with a lever arm 55 by means of which it may be rotated in opposite directions, thus to shift the slide 40 accordingly.

The slide 40 has an axial passage 60 from end to end and radial ports or bores 61—61 open from this bore through the medial part of decreased diameter, to the exhaust chamber for discharge of steam that leaks past the end portions 40'. Likewise, the poppet valves have axial ports 64 to relieve the valve cages of steam that leaks past the valve aprons 22 thus to eliminate back pressure.

With the parts of the valve so designed and assembled, it will be understood that when the slide 40 is in its neutral position, as of Fig. 3, both poppet valves will be yieldingly held in closed or seated position by their respective coiled springs 23. By the turning of the pinion gear 50 in a clockwise direction, with reference to its showing in Fig. 3, the slide will be shifted thereby toward the left and will engage with and unseat the poppet valve 21 against which it moves as in Fig. 6. When this valve opens, steam is allowed to flow from the channel 17, past the valve through passages 25 and 26 into the cylinder C through port 6 and passage 8 to drive the piston therein toward the right hand end of the cylinder. Exhaust steam will flow from the cylinder C through passage 9, port 7, passage 47, bore 11 and to exhaust port 45. Movement of the piston P in cylinder C can be stopped at any position by shifting the slide 40 back to a neutral position to cut off both intake and exhaust.

If the pinion gear 50 is turned in a counter clockwise direction, with reference to its showing in Fig. 3, the slide 40 will be shifted to the right as in Fig. 5, and will unseat the poppet valve at that end, thus to admit steam to the right hand end of cylinder C, through the corresponding passages 26 and 8. Exhaust will flow through passages 9 and 47 connected with the other end of the cylinder, to the exhaust passage 45 of the housing 10.

Having thus described my invention, what I claim as new therein and desire to secure by Letters Patent, is:

1. A control valve for a double acting cylinder having an inlet and an exhaust port for each of its opposite ends: said valve comprising a housing formed with a longitudinal bore, provided near its opposite ends with outwardly facing valve seats, and having supply passages therein for delivering a pressure medium to the bore at the outsides of the seats, and there being inlet passages leading from the bore at the inside of the seats, respectively, to serve the inlet ports at opposite ends of the cylinder, respectively, an exhaust chamber in said housing open to the medial portion of the bore and exhaust passage to serve the exhaust ports at opposite ends of said cylinder and opening into the said exhaust chamber, a poppet valve slidably fitted in each of the opposite end portions of the bore, means closing the outer ends of the housing bore, springs mounted by said means and acting against said valves to urge them to closing positions, each poppet valve comprising a head portion for closing against the seat and a body portion closing off the bore between the inlet passage leading from that end and the exhaust passage that serves the opposite end of the cylinder, a valve actuating slide fitted in the bore between the valves, and formed with rack teeth, a gear in the housing in operative mesh with said teeth and an operating shaft for the said slide comprising piston-like opposite end portions normally overlying the outlets of the exhaust passages and adapted to selectively uncover said passages with the shifting of the slide for the selective opening of the poppet valves.

2. A control valve for a double acting cylinder having an inlet and an exhaust port for each of its opposite ends; said valve comprising a housing formed with a longitudinal bore, provided near its opposite ends with outwardly facing valve seats, and having supply passages therein for delivering a pressure medium to the bore at the outsides of the seats, and there being inlet passages leading from the bore at the inside of the seats, respectively, an exhaust chamber in said housing open to the medial portion of the bore and exhaust passage to serve the exhaust ports at opposite ends of said cylinder and opening into the said exhaust chamber, a poppet valve slidably fitted in each of the opposite end portions of the bore, means closing the outer ends of the housing bore, springs mounted by said means and acting against said valves to urge them to closing positions, each poppet valve comprising a head portion for closing against the seat and a body portion closing off the bore between the inlet passage leading from that end and the exhaust passage that serves the opposite end of the cylinder, a valve actuating slide fitted in the bore between the valves, and means for actuating the slide selectively in either direction; said slide comprising piston-like opposite end portions normally overlying the outlets of the exhaust passages and adapted to selectively uncover said passages with the shifting of the slide for a selective opening of the poppet valves.

HENRY W. RINGMAN.

REFERENCES CITED

The following references are of record in the file of this patent:

UNITED STATES PATENTS

| Number | Name | Date |
|---|---|---|
| 458,191 | Ripley | Aug. 25, 1891 |
| 2,445,585 | Shaff | July 20, 1948 |
| 2,466,795 | Crot | Apr. 12, 1949 |
| 2,482,249 | Court | Sept. 20, 1949 |